United States Patent [19]

Petre et al.

[11] Patent Number: 4,623,764
[45] Date of Patent: Nov. 18, 1986

[54] MEANS ELECTRICALLY GROUNDING A MOTOR

[75] Inventors: Mark L. Petre, Pittsboro; Michael W. Lock, Greenwood, both of Ind.

[73] Assignee: Emhart Industries, Inc., Indianapolis, Ind.

[21] Appl. No.: 745,493

[22] Filed: Jun. 17, 1985

[51] Int. Cl.⁴ .................... H01H 9/02; H01H 43/00
[52] U.S. Cl. .................... 200/38 R; 200/293; 174/51
[58] Field of Search ............ 174/51; 200/38 R, 38 B, 200/38 BA, 38 C, 293; 310/68 C, 89, 91

[56] References Cited

U.S. PATENT DOCUMENTS

| | | | |
|---|---|---|---|
| 3,500,005 | 3/1970 | Brown | 200/38 B |
| 3,676,725 | 7/1972 | Wiser et al. | 310/89 |
| 3,742,159 | 6/1973 | Brown | 200/38 R |
| 4,166,206 | 8/1979 | Deane et al. | 310/68 C X |

Primary Examiner—J. R. Scott
Attorney, Agent, or Firm—Robert F. Meyer

[57] ABSTRACT

A timer housing, gear train housing, and motor housing are axially aligned with the timer housing being connected to the gear train housing through electrically conductive fasteners extending through the timer housing. A metal strap carried by the timer housing provides for an electrical ground through the electrically conductive fasteners for the timer motor. The metal strap is swaged to receptacles which receive metal fasteners to fasten the whole assembly to a metal base.

2 Claims, 2 Drawing Figures

MEANS ELECTRICALLY GROUNDING A MOTOR

BACKGROUND OF THE INVENTION

As well known in the timer art, electrical motors, such as synchronous motors, are used in combination with timers to drive the timer, the timer then being used to actuate devices according to a programmed sequence. An example of such combinations is a motor used to drive a timer which in turn controls sequentially the elements of an appliance such as a dishwasher.

Because of the electric current being used by the motor and the timer, it is essential that both the timer and the motor be electrically grounded. In the case of the timer, it is usually grounded through a mounting plate which mounts the timer to the appliance. In the case of the motor, it is usually grounded through a lead wire connecting the motor to the timer. Because of safety reasons, pains must be taken to insure that such connections are securely made. This is especially true in the case of providing a reliable means for the user to connect and electrically ground the timer and motor to his appliance.

SUMMARY OF THE INVENTION

Accordingly, the present invention pertains to a timing mechanism assembly comprising a timer carried in a plastic housing, a gear train carried in a first metal housing in line with and carried by the plastic housing at an end thereof, a motor carried in a second metal housing that is carried by and in line with the first metal housing, electrically conductive fastening means extending through the plastic housing and connecting the same to the first metal housing, and an electrical ground means for electrically grounding the motor comprising a metal strap carried by the plastic housing on an outer surface thereof at an end opposite the end carrying the first metal housing and which is connected to the electrically conductive fastening means, and at least one metal receptacle provided in the plastic housing, the metal strap swaged to the metal receptacle at its open end to insure a good electrical connection at its open end.

DETAILED DESCRIPTION OF THE INVENTION

Figure 1:
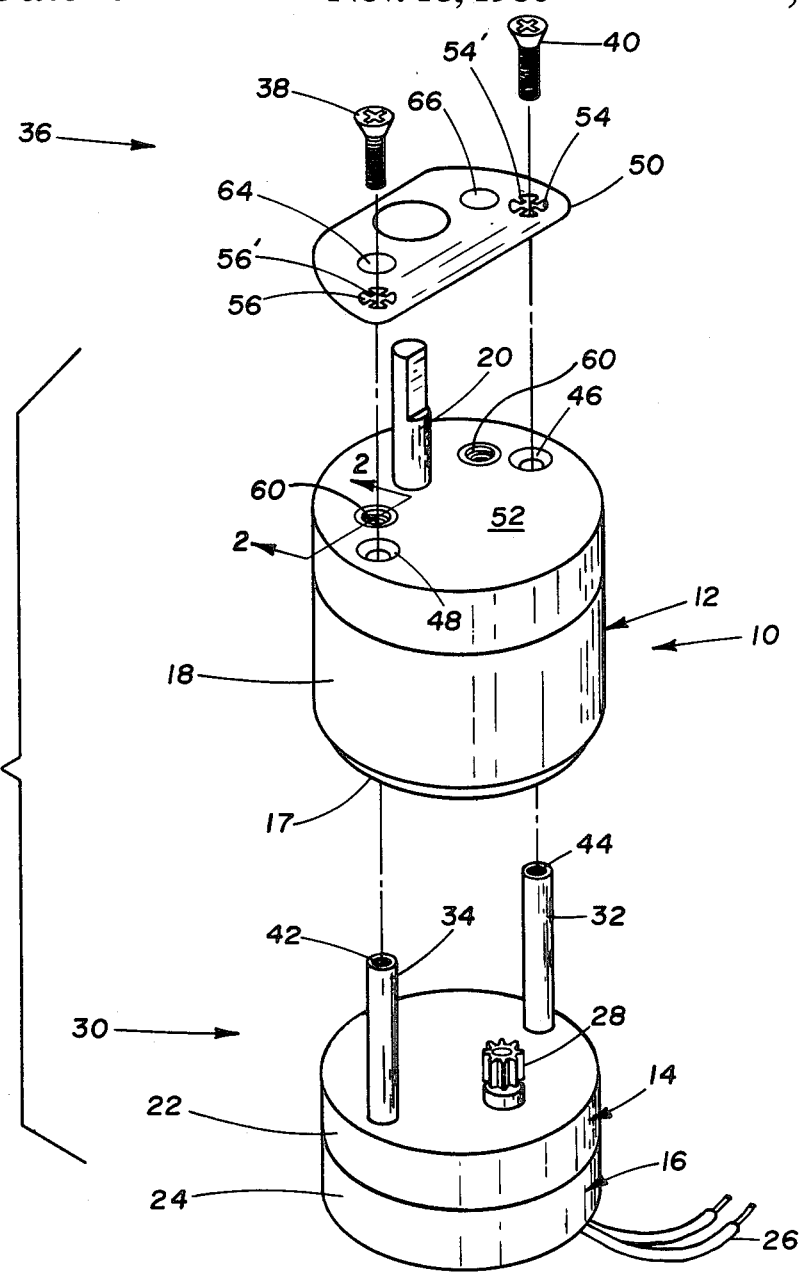
FIG. 1 is an exploded view of a timing mechanism employing the invention.

Referring now to the drawing, there is shown a timing mechanism 10 which includes a timer 12, a speed reducing means such as a gear train 14, and a synchronous motor 16. The timing mechanism illustrated herein, and for which the electrical grounding means is particularly useful, is completely described in U.S. Pat. No. 3,500,005 issued Mar. 10, 1970 to W. R. Brown and which is incorporated herein by reference. In general, timer 12 includes a plastic housing 18 in which are carried at least one rotatable cam and switching means which open and close in response to the cams rotation to open and close electrical circuits to devices or elements to be actuated. A shaft 20 permits the timer to be manually set. The gear train 14 and synchronous motor 16 are disposed within metal housings 22 and 24 respectively, the two housings being held together by some suitable means. The details of a gear train and a synchronous motor and the means for connecting their housings are described and illustrated in U.S. Pat. No. 3,676,725 issued July 11, 1972 to Joseph E. Wiser et al, which is also incorporated herein by reference. Electrical power to the motor is supplied through leads 26. Gear train output pinion 28 engages a gear within timer housing 18 to cause rotation of the cam.

As is illustrated and described in the aforementioned U.S. Pat. No. 3,500,005, timer housing 18 is connected at an end 17 to the gear train housing 22 through electrically conductive fastening means 30. Electrically conductive fastening means 30 includes metal posts 32 and 34 connected to and extending from gear train housing 14 into at least a portion of housing 22, and connecting means 36. Connecting means 36 includes screws 38 and 40 which are threaded into internal threads 42 and 44 of the posts through apertures 46 and 48 provided in timer housing 18.

Figure 2:
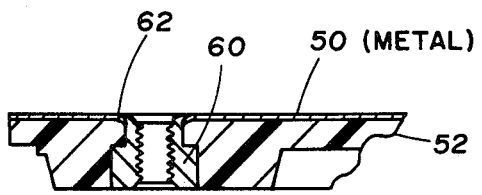
FIG. 2 is a section taken along the line 2—2 of FIG. 1 with their components being assembled.

In accordance with the present invention, an electrical ground is provided for synchronous motor 16 by an electrical metal strap 50 which is held to end 52 of the timer housing 18 through screws 38 and 40, the screws engaging the posts 42 and 44 through apertures 54 and 56. As shown, a plurality of tabs 54' and 56' extend from the strap into the apertures to engage the screws and provide a better, positive electrical connection. The timing mechanism 10, in use, is usually mounted to a mounting plate of the appliance through end 52 of the housing so as to be grounded through the strap 50, screws 38 and 40, posts 42 and 44, and the metal gear train housing 22 to the metal motor housing 24. Referring to FIGS. 1 and 2, the timing mechanism is mounted to the appliance mounting plate through screws (not shown) which are threaded into internally threaded sleeves 60 which are carried in end 52. The sleeves are swaged or rolled over at 62 to strap 50 to provide a positive electrical connection between the plate and the sleeve. Then when a screw (not shown) is fed through openings 64 and 66 into the sleeves 60 a positive electrical connection is maintained between strap 50 and the mounting plate (not shown).

What is claimed is:

1. A timing mechanism assembly comprising a timer carried in a plastic housing, a gear train carried in a first metal housing in line with and carried by said plastic housing at an end thereof, a motor carried in a second metal housing that is carried by and in line with said first metal housing, and electrically conductive fastening means extending through said platic housing and connecting same to said first metal housing, and an electrical ground means for said motor comprising:
   a metal strap carried by said plastic housing on an outer surface thereof at an end opposite said end carrying said first metal housing and at least one tab extending from said metal strap and engaging said electrically conductive fastening means, and
   at least one metal receptacle provided in said plastic housing, said receptacle swaged to said metal strap at its open end to insure a good electrical connection between said metal receptacle and said metal strap.

2. In a timing mechanism according to claim 1 wherein said receptacle is an internally threaded sleeve.

* * * * *